(12) United States Patent
Park et al.

(10) Patent No.: US 8,433,184 B2
(45) Date of Patent: Apr. 30, 2013

(54) METHOD FOR DECODING IMAGE BLOCK

(75) Inventors: Seung Wook Park, Sungnam-si (KR); Ji Ho Park, Sungnam-si (KR); Byeong Moon Jeon, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 12/662,606

(22) Filed: Apr. 26, 2010

(65) Prior Publication Data

US 2010/0208799 A1 Aug. 19, 2010

Related U.S. Application Data

(63) Continuation of application No. 11/293,158, filed on Dec. 5, 2005, now Pat. No. 7,734, 151.

(60) Provisional application No. 60/632,992, filed on Dec. 6, 2004.

(30) Foreign Application Priority Data

Jun. 30, 2005 (KR) .......................... 10-2005-0057561

(51) Int. Cl.
*H04N 5/93* (2006.01)
(52) U.S. Cl.
USPC .......................................... 386/353; 386/354
(58) Field of Classification Search .................. 386/353, 386/354, 355, 356, 328, 329
See application file for complete search history.

(56) References Cited

U.S. PATENT DOCUMENTS

| | | | | |
|---|---|---|---|---|
| 5,841,477 A | * | 11/1998 | Kim | 375/240.24 |
| 6,993,076 B1 | | 1/2006 | Comer et al. | |
| 2005/0265450 A1 | | 12/2005 | Raveendran et al. | |

FOREIGN PATENT DOCUMENTS

KR 10-1998-0032192 7/1998

OTHER PUBLICATIONS

Notice of Allowance for corresponding Korean Application No. 2005-57561 dated Feb. 17, 2009 and English translation thereof.

* cited by examiner

*Primary Examiner* — Robert Chevalier
(74) *Attorney, Agent, or Firm* — Harness, Dickey & Pierce, P.L.C.

(57) ABSTRACT

Disclosed is a method for decoding an image block. The method comprises a step of decoding an image block of a first layer based on a corresponding block of a second layer encoded with an intra mode, wherein a first area is formed with pixels, which are adjacent to a corner pixel positioned in the corresponding block in a diagonal direction and extend in vertical and horizontal directions away from the corresponding block, and data are padded in the first area based on the corner pixel and the pixels positioned in the first area and at least one of first and second blocks, which are simultaneously adjacent to the corresponding block and encoded with the intra mode. Accordingly, a reference block required when a macro block is encoded in an intra base mode or when a macro block encoded in the intra base mode is decoded has more precise values, thereby enabling improvement of a coding efficiency.

8 Claims, 5 Drawing Sheets

METHOD FOR DECODING IMAGE BLOCK

PRIORITY INFORMATION

This application is a continuation of U.S. application Ser. No. 11/293,158, filed Dec. 5, 2005 now U.S. Pat. No. 7,734,151, which claims priority to U.S. provisional application 60/632,992, filed Dec. 6, 2004, and Korean Application No. 10-2005-0057561, filed Jun. 30, 2005; the entire contents of U.S. application Ser. No. 11/293,158, U.S. provisional 60/632,992, and Korean Application No. 10-2005-0057561 are hereby incorporated by reference.

BACKGROUND OF THE INVENTION

1. Field of the Invention

The present invention relates to a method for decoding an image block, and more particularly to a method for decoding an image block which includes padding for a block of a base layer corresponding to an image block of an enhanced layer when an image signal is scalably decoded.

2. Description of the Prior Art

It is difficult to allocate a broadband available for TV signals to wirelessly transmitted/received digital image signals wirelessly transmitted/received from/in a portable phone and a notebook computer, which have been extensively used, and a mobile TV and a hand held PC, which are expected to be extensively used in the future. Accordingly, a standard to be used for an image compression scheme for such portable devices must enable an image signal to be compressed with a relatively high efficiency.

In addition, such portable mobile devices are equipped with various processing and presentation capabilities. Accordingly, compressed images must be variously prepared corresponding to the capabilities of the portable devices. Therefore, the portable devices must be equipped with image data having various qualities obtained through the combination of various parameters including the number of transmission frames per second, resolution, and the number of bits per pixel with respect to one image source, burdening content providers.

For this reason, the content provider prepares compressed image data having a high bit rate with respect to one image source so as to provide the portable devices with the image data by decoding the compressed image and then encoding the decoded image into image data suitable for an image processing capability of the portable devices requesting the image data. However, since the above-described procedure necessarily requires trans-coding (decoding+scaling+encoding), the procedure causes a time delay when providing the image requested by the portable devices. In addition, the trans-coding requires complex hardware devices and algorithms due to the variety of a target encoding.

In order to overcome these disadvantages, there is suggested a Scalable Image Codec (SVC) scheme. According to the SVC scheme, an image signal is encoded with a best image quality in such a manner that the image quality can be ensured even though parts of the overall picture sequences (frame sequences intermittently selected from among the overall picture sequences) derived from the encoding are decoded.

A motion compensated temporal filter (or filtering) (MCTF) is an encoding scheme suggested for the SVC scheme. The MCTF scheme requires high compression efficiency, that is, high coding efficiency in order to lower the number of transmitted bits per second because the MCTF scheme is mainly employed under a transmission environment such as mobile communication having a restricted bandwidth.

As described above, although it is possible to ensure image quality even if only a part of the sequence of a picture encoded through the MCTF, which is a kind of the SVC scheme, is received and processed, image quality may be remarkably degraded if a bit rate is lowered. In order to overcome the problem, an additional assistant picture sequence having a low transmission rate, for example, a small-sized image and/or a picture sequence having the smaller number of frames per second may be provided.

The assistant picture sequence is called a base layer, and a main picture sequence is called an enhanced (or enhancement) layer. The enhanced layer has a relative relationship with the base layer. Herein, several base layer having different resolution may be provided. For example, on an assumption that image resolution of the enhanced layer has resolution of 4CIF (4 times common intermediate format), a first base layer having resolution of CIF and a second base layer having resolution of QCIF (Quarter CIF) may be provided with the enhanced layer.

When comparing image resolutions or image sizes with each other, the 4 CIF is four times the CIF or 16 times the QCIF based on the number of overall pixels or an area occupied by overall pixels when the pixels are arranged with the same interval in right left directions. In addition, based on the number of pixels in a width direction and a length direction, the 4CIF becomes twice of the CIF and four times the QCIF. Hereinafter, the comparison of the image resolution or the image sizes is achieved based on the number of pixels in width and length directions instead of the area or the number of the overall pixels, so that the resolution of the CIF becomes a half the 4CIF and twice the QCIF.

Since layers having different resolution are obtained by encoding the same image contents with different spatial resolution and frame rates, redundancy information exists in data streams encoded for the layers. Accordingly, in order to improve coding efficiency of a predetermined layer (e.g., the enhanced layer), there is suggested an inter-layer prediction scheme for predicting an image signal of the predetermined layer (the enhanced layer) using a data stream encoded for an image signal of a layer (e.g., the base layer) having relatively lower resolution as compared with that of the predetermined layer.

The inter-layer prediction scheme includes an intra texture prediction scheme, a residual prediction scheme, and a motion prediction scheme.

In the intra texture scheme, a prediction image for a predetermined macro block of the enhanced layer is created in an intra base mode (intra_BASE_mode) based on a corresponding block of the base layer (this corresponding block has a relative position identical to that of the predetermined macro block in a frame) encoded in an intra mode.

In the residual prediction scheme, an additional prediction operation is performed with respect to the prediction image of the enhanced layer generated for a main picture sequence based on a prediction image of a base layer generated for an assistant picture sequence. Since the prediction image denotes an image having image difference values, that is, residual data, obtained through a prediction operation for the macro block, the macro block is encoded into a block having difference values of residual data through the residual prediction scheme.

In the motion prediction scheme, a motion vector of a picture of the enhanced layer temporally simultaneous with a motion vector of a picture of the base layer is encoded based on based on the motion vector of the base layer.

Figure 1:
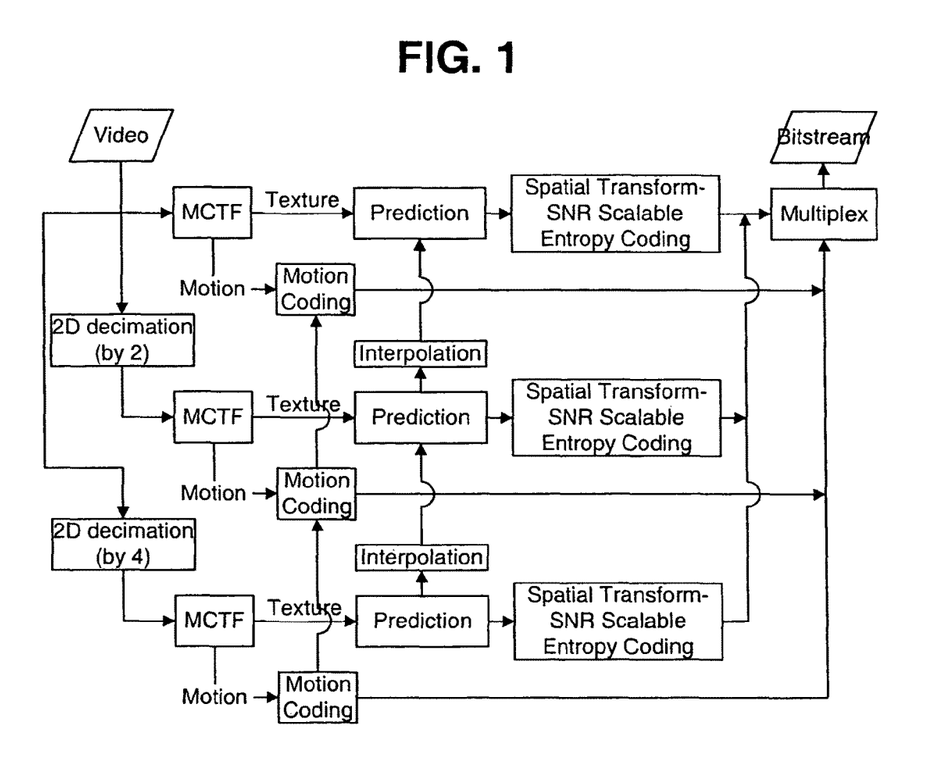
FIG. 1 is a block diagram illustrating the '2D+t' structure of a scalable codec.

FIG. 1 is block diagram illustrating the structure of a scalable codec employing scalability according to temporal, spatial, and SNR or quality aspects based on a '2D+t' structure.

One image source is encoded by classifying several layers having different resolutions including an image signal with an original resolution (an image size), an image signal with half original resolution, and an image signal with a quarter original resolution. In this case, the same encoding scheme or different encoding schemes may be employed for the several layers. The present invention employs an example in which the layers are individually encoded through the MCTF scheme.

In order to use redundancy information between layers, a block in a predetermined layer may be encoded into a block having difference values of residual data or into an intra base mode block by using a block in a data stream encoded for a layer having resolution lower than that of the predetermined layer (having an image size smaller than that of the predetermined layer). In addition, motion information relating to motion estimation generated through the MCTF may be used in order to predict motion information of a layer having relatively higher resolution.

In the meantime, the intra texture prediction scheme generating the intra base mode block may be applied to a case in which a corresponding block of the base layer is positioned in a block encoded in the intra mode. Herein, the corresponding block is temporally simultaneous with a macro block in the enhanced layer for a prediction image to be found and has a relative position identical to that of the macro block in a frame. In addition, when the macro block in the enhanced layer is encoded in an intra base mode, the corresponding block of the base layer encoded in the intra mode is reconstructed to an original image based on pixel values of another area for the intra mode, the size of the reconstructed corresponding block is enlarged to the size of the macro block through a padding process and an interpolation process using a de-blocking filter and a half-pel interpolation filter for the reconstructed corresponding area, and then, a prediction operation is performed. Through the padding process, the corresponding block of the base layer encoded in the intra mode is enlarged by three pixels in up, down, right, and left directions.

Figure 2:
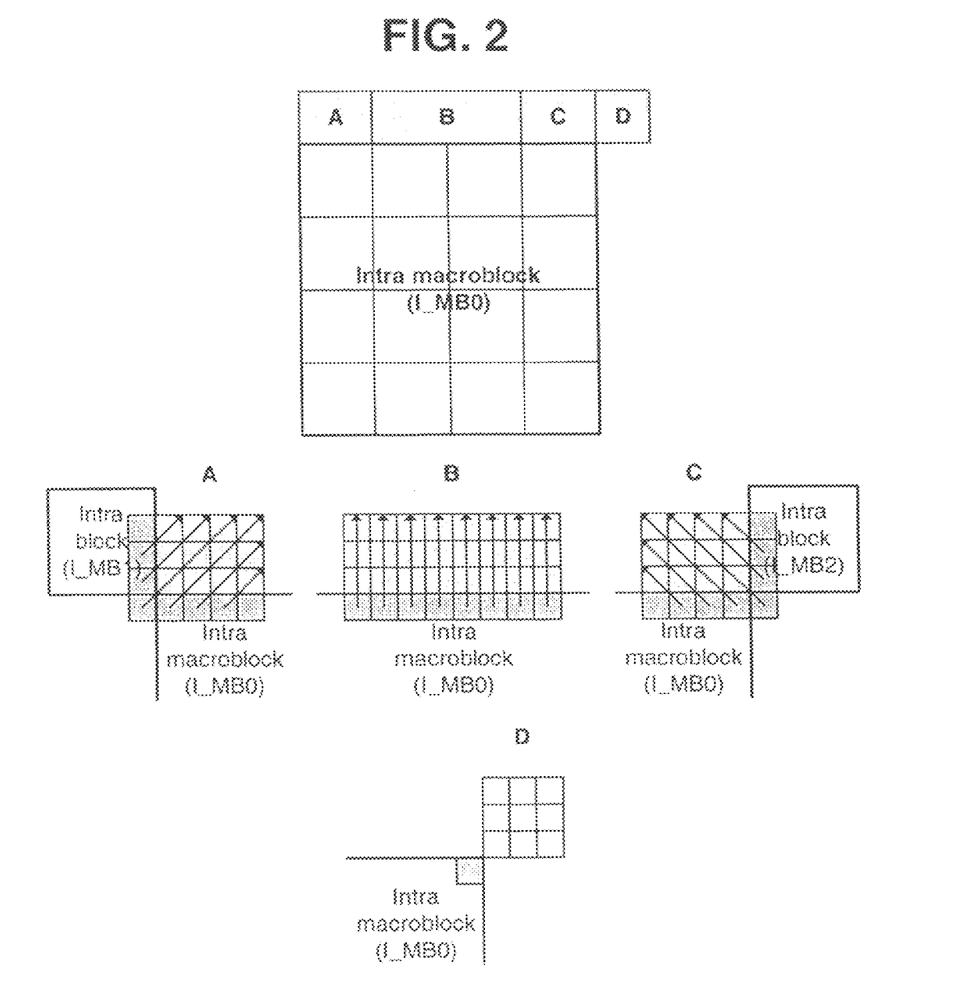
FIG. 2 is a view illustrating an example in which pixels are padded in the upper direction of an up boundary of a corresponding block encoded in an intra mode and a right-up boundary.

FIG. 2 is a view illustrating an example in which pixels are padded in the upper direction of an up boundary of a corresponding block (this block is encoded in an intra mode and reconstructed into an original image) and a right-up boundary, which extends in the right direction from the up boundary. If other boundaries such as right and down-right boundaries, down and left-down boundaries, and left and up-left boundaries shown in FIG. 2 match with the up and right-up boundaries if they are sequentially rotated by 90 degrees, so that the pixels can be padded on the above boundaries in the same manner.

Padding areas provided in the upper direction of the up boundary and the right-up boundary of a 16×16-sized block I_MBO (which has been encoded in the intra mode and is reconstructed into an original image) may be divided into A, B, C, and D blocks. The down boundaries of the blocks of A, B, and C make contact with the up boundary of the I_MBO. However, in the 3×3-sized D block, only the most left-down pixel makes contact with the most right-up pixel of the I_MBO in a diagonal direction thereof. The left boundary of the 4×3-sized A block is in line with the left boundary of the I_MB0, and the right boundary of the 4×3-sized C block is in a line with the right boundary of the I_MB 0. In the 8×3-sized B block, the left boundary and the right boundary thereof are positioned between the left boundary and the right boundary of the I_MB 0. In the D block, it may be represented that the down boundary of thereof makes contact with a boundary generated by extending the up boundary of the I_MB 0 in a right direction.

Hereinafter, schemes of padding data in pixels of the A, B, C, and D blocks will be sequentially described.

A coordinate (a position) of a pixel is represented as [x,y], and a pixel value is represented as p[x,y]. It is assumed that the most left-up pixel of the I_MB0 is [0,0]. A pixel of the A block may be represented as [i,–j], wherein i=0, . . . , 3, j=1, 2, 3. In the following description, a pixel value p[x,y] does not indicate a harmonic component of an encoded image, but indicates a pixel value of a reconstructed original image.

I) If the A block is positioned at a block encoded in the intra mode, a pixel value in the A block is maintained.

If the A block is not positioned at the block encoded in the intra mode, it is determined whether or not [−1, −1] is positioned at an internal block, that is, the internal block exists in the left of the A block.

II) If [−1,−1] is positioned in the intra block of I_MB1 as the determination result, each pixel value p[i,–j] in the A block is calculated through a predetermined scheme based on pixels ([i, 0], i=0, 1, 2, 3) of the up boundary of the I_MB0, pixels ([−1, –j], j=1, 2, 3) of the right boundary of the I_MB 1, and a pixel ([−1, 0]) making contact with the most left-down pixel of the A block in a diagonal direction. For example, an intra 8×8 diagonal down right prediction scheme of the H.264 shown in FIG. 2 may be employed for calculating each pixel value of p[i,–j].

In this case, if the pixel [−1, 0] used for calculating each pixel value p[i,–j] in the A block is positioned in the intra block, the value of the pixel [−1, 0] is maintained. In contrast, if the pixel [−1, 0] is not positioned in the intra block, the value of the pixel [−1,0] is calculated by p[−1,0]−(p[−1,−1]+p[0,0]+1)/2.

In contrast, III) if a pixel of [−1,−1] is not positioned at the intra block I_MB1 as the determination result, p[i,–j] becomes p[i,0], wherein i=0, 1, 2, 3, j=1, 2, 3. That is, each pixel of the A block is padded with a value identical to that of a pixel on the up boundary of the I_MB 0 having the same x-axis coordinate.

Hereinafter, a scheme for padding data at a pixel [i,–j] in the B block will be described, wherein i=4, . . . , 11, j=1, 2, 3.

If the B block is positioned at a block encoded in the intra mode, pixel values in the B block are maintained as they are.

In contrast, if the B block is not positioned at the block encoded in the intra mode, p[i,–j] becomes p[i,0] similarly to the iii) case of the A block, wherein i=4, . . . , 11, j=1, 2, 3. That is, each pixel of the B block is padded with a value identical to that of a pixel on the up boundary of the I_MB0 having the same x-axis coordinate.

Hereinafter, a scheme for padding data in a pixel ([i–j], i=12, . . . , 15, j=1, 2, 3) in the C block will be described. Similarly to the A block, the C block is padded.

If the C block is positioned in a block encoded in the intra mode, pixel values in the C block are maintained as they are.

If the C block is not positioned in the block encoded in the intra mode, it is determined whether or not a pixel [16, −1] is positioned in the intra block, that is, the intra block exists in the right of the C block.

If a pixel [16,−1] is positioned at the intra block I_MB2 as the determination result, each pixel value p[i–j] in the C block is calculated through a scheme (in which a pixel coordinate moves along only a diagonal axis) similar to the predetermined scheme used when the block A is padded based on a pixel ([i,0], i=12, 13, 14, 15) on the up boundary of the I_MB0, a pixel ([16,−j], j=,1, 2, 3) on the left boundary of the I_MB2, a pixel ([16,0]) making contact with the most right-down pixel of the C block.

In this case, if a pixel ([16,0]) used for calculating each pixel value p[i,−j] in the C block is positioned at the intra block, the pixel value of [16,0] is maintained as it is. If the pixel ([16,0]) is not positioned in the intra block, p[16, 0] is equal to (p[15,0]+p[16,−1]+1)/2.

In contrast, if the [16,−1] is not positioned in the I_MB2, p[i,−j]=p[i, 0] as the determination value, wherein i=12, 13, 14, 15, j=1, 2, 3. That is, each pixel of the C block is padded with a value identical to that of a pixel on the up boundary of the I_MB 0 having the same x-axis coordinate.

Hereinafter, a scheme of padding data in a pixel ([i,−j], i=16, 17, 18, j=1, 2, 3) will be described.

If the D block is positioned in a block encoded in the intra mode, pixel values in the D block are maintained as they are.

However, if the D block is not positioned at a block encoded in the intra mode, each pixel in the D block is padded with the same value as the most right-up pixel ([15,0]) of the I_MB0 making contact with the D block in a diagonal direction. That is, p[i,−j]=p[15,0], wherein i=16, 17, 18, j=1, 2, 3.

Although the scheme for padding data in the pixel of the D block is simple, if the D block is not positioned at a block encoded in the intra mode, the pixel of the D block is not precisely padded.

SUMMARY OF THE INVENTION

Accordingly, the present invention has been made to solve the above-mentioned problems occurring in the prior art, and an object of the present invention is to provide a method for precisely performing padding with respect to an area making contact with a corner pixel of a corresponding block of a base layer encoded in an intra mode in a diagonal direction when padding the corresponding block to be enlarged as a reference block for a macro block of an enhanced layer in order to encode the macro block in the intra mode or decode the macro block encoded in the intra mode, thereby improving an coding efficiency.

In order to accomplish the object of the present invention, there is provided a method for decoding an image block, the method comprising a step of decoding an image block of a first layer based on a corresponding block of a second layer encoded with an intra mode, wherein a first area is formed with pixels, which are adjacent to a corner pixel positioned in the corresponding block in a diagonal direction and extend in vertical and horizontal directions away from the corresponding block, and data are padded in the first area based on the corner pixel and the pixels positioned in the first area and at least one of first and second blocks, which are simultaneously adjacent to the corresponding block and encoded with the intra mode.

According to an embodiment of the present invention, a pixel value of the first area is maintained if a block including the first area is encoded in an intra mode. The pixel value of the first area is calculated using the corner pixel and pixels adjacent to the first area among pixels in both the first block and the second block if the block including the first area is not encoded in the intra mode, and if both the first block and the second block are encoded in the intra mode. In a case in which the block including the first area is not encoded in the intra mode and only one of the first block and the second block is encoded in the intra mode, a value of a pixel positioned at an area close to the block encoded in the intra mode is calculated based on a pixel positioned adjacent to the first area in the block encoded in the intra mode, and a pixel positioned on a diagonal line and a pixel posited in another area are padded with the value of the corner pixel based on the diagonal line including pixels in the first area adjacent to the corner pixel in the diagonal direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXAMPLE EMBODIMENTS

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 3:
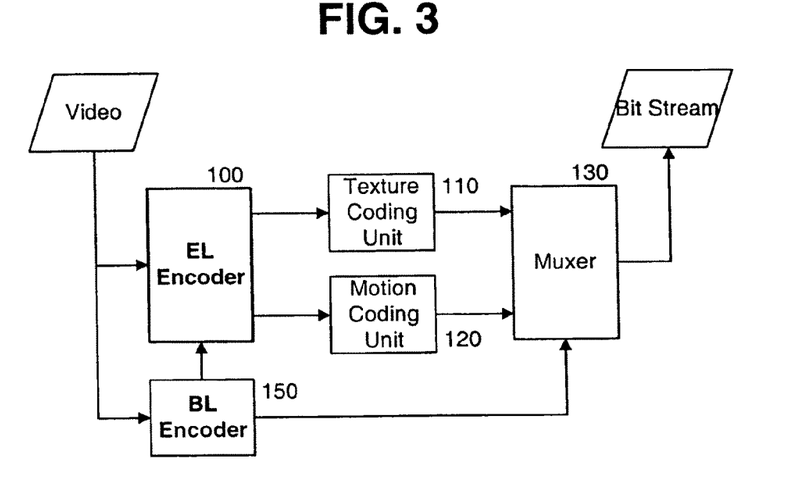
FIG. 3 is a block diagram illustrating the structure of an image signal encoding device employing a scalable coding scheme for an image signal.

FIG. 3 is a block diagram illustrating the structure of an image signal encoding device employing a scalable coding scheme for an image signal according to the present invention.

The image signal encoding device shown in FIG. 3 includes an enhanced layer (EL) encoder 100 for scalably encoding an input image signal based on a macro block through a Motion Compensated Temporal Filter (MCTF) scheme and generating suitable management information, a texture coding unit 110 for converting the encoded data of each macro block into a compressed bit string, a motion coding unit 120 for coding motion vectors of an image block obtained from the EL encoder 100 into a compressed bit string through a specific scheme, a base layer encoder 150 for encoding an input image signal through a predetermined scheme such as the MPEG 1, 2, 4, H.261, or H.264 and generating the sequence of small-sized images, for example, the sequence of pictures having 25% of an original image size if necessity, a muxer 130 for encapsulating the output data of the texture coding unit 110, the picture sequence of the BL encoder 150, and an output vector data of the motion coding unit 120 in a predetermined format, multiplexing the data with each other in a predetermined format, and then outputting the multiplexed data.

The EL encoder 100 performs a prediction operation for subtracting a reference block obtained through motion estimation from a macro block in a predetermined image frame (or picture) and performs an update operation by adding the image difference between the macro block and the reference block to the reference block.

Figure 4:
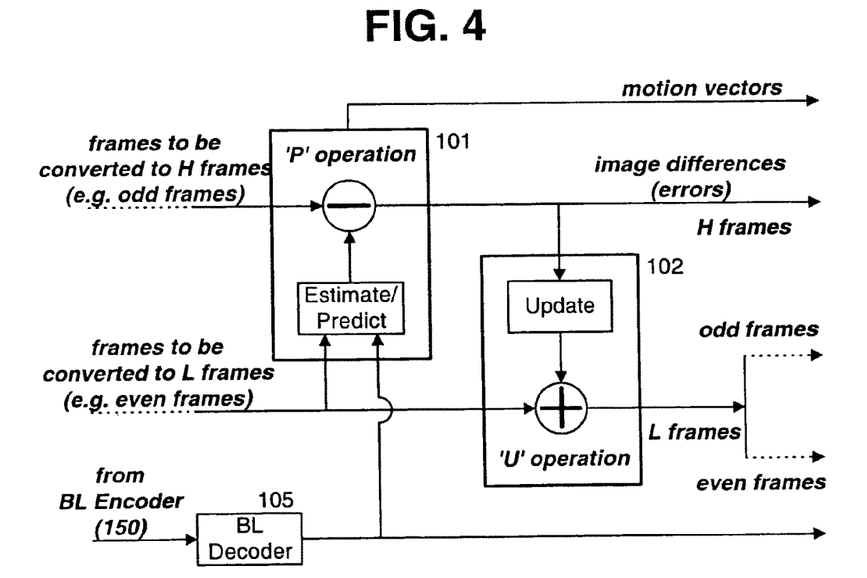
FIG. 4 is a view illustrating a temporal decomposition procedure for an image signal in one temporal decomposition level.

The EL encoder 100 divides the sequence of input image frames into frames, which will have image difference values, and frames, to which the image difference values will be added. For example, the EL encoder 100 divides the input image frames into odd frames and even frames. Then, the EL encoder 100 performs the prediction operation and the update operation with respect to, for example, one group of pictures (GOP) through several levels until the number of L frames (frames generated through the update operation) becomes one. FIG. 4 illustrates the structure relating to the prediction operation and the update operation in one of the above levels.

The structure shown in FIG. 4 includes a BL decoder 105, for extracting encoded information including division information, mode information, and motion information from a base layer stream for the small-sized image sequence encoded in the BL encoder 150 and reconstructing the encoded base layer stream, an estimation/prediction unit 101 for estimating a reference block for each macro block included in a frame, which may have residual data through motion estimation, that is an odd frame, in even frames provided before or after the odd frame (inter-frame mode), in its own frame (intra mode), or in a corresponding block encoded in an intra mode in a contemporary frame of the base layer (intra_BASE mode) and performing a prediction motion for calculating a motion vector and/or a image difference between the macro block and the reference block (difference values between corresponding pixels), and an update unit 102 for performing the update operation through which an image difference calculated with respect to the macro block is normalized and the normalized image difference is added to a corresponding reference block in the adjacent frame (e.g., the even frame) including the reference block for the macro block.

The operation performed by the estimation/prediction unit 101 is called a "P" operation, a frame generated through the P operation is called an "H" frame, and residual data existing in the H frame reflects a harmonic component of an image signal. In addition, the operation performed by the update unit 102 is called a "U" operation, a frame generated through the U operation is called an "L" frame, and the L frame has a low sub-band picture.

The estimation/prediction unit 101 and the update unit 102 shown in FIG. 4 can parallely and simultaneously process a plurality of slices divided from one frame instead of a frame unit. In the following description, the term "frame" can be replaced with the "slices" if it does not make technical difference, that is, the frame includes the meaning of the slices.

The estimation/prediction unit 101 divides input image frames or odd frames of L frames obtained through all levels into macro blocks having a predetermined size, searches temporally adjacent even frames, a current frame, or a frame in a contemporary base layer in the same temporal decomposition level for blocks having the most similar images to images of divided macro blocks, makes a prediction image of each macro block based on the searched block, and finds a motion vector of the macro block.

A block having the highest correlation has the smallest image difference between the block and a target block. The image difference is determined as the sum of pixel-to-pixel difference values or the average of the sum. The smallest macro block (the smallest macro blocks among blocks) having at most a predetermined threshold value is (are) called a reference block (reference blocks).

If the reference block is searched in the adjacent frame or the current frame, the estimation/prediction unit 101 finds a motion vector to the reference block from the current macro block to be delivered to the motion coding unit 120 and calculates a pixel difference value between each pixel value of the reference block (in a case of one frame) or each mean pixel value of reference blocks (in a case of plural frames) and each pixel value of the current macro block, or a pixel difference value between each pixel average value of the reference block (in a case of plural frames) and the pixel value of the current macro block, thereby encoding a corresponding macro block. In addition, the estimation/prediction unit 101 inserts a relative distance between a frame including the selected reference block and a frame including the current macro block and/or one of reference block modes such as a Skip mode, a DirInv mode, a Bid mode, a Fwd mode, a Bwd mode, and an intra mode into a header field of the corresponding macro block.

If a corresponding block (having a relative position identical to that of the macro block in a frame) encoded in a frame of the base layer temporally simultaneous with the macro block is found as a reference block, the estimation/prediction unit 101 enlarges the size of the corresponding block to the size of the macro block through padding and interpolation according to the present invention, calculates pixel difference values between the enlarged corresponding block and the macro block, and then encodes the pixel difference values in the corresponding macro block. In addition, the estimation/prediction unit 101 records an intra_Base mode value on the header field of the corresponding macro block.

The estimation/prediction unit 101 performs the procedure with respect to all macro blocks in a frame, thereby making an H frame, which is a prediction image, for the frame. In addition, the estimation/prediction unit 101 makes H frames, which are prediction images for frames, with respect to input image frames or all odd frames of L frames obtained through all levels.

As described above, the update unit 102 adds image difference values for macro blocks in the H frame generated by the estimation/prediction unit 101 to L frames (input image frames or even frames of L frames obtained through all levels) having corresponding reference blocks.

A data stream encoded through the above-described scheme may be delivered to a decoding device through wire or wireless transmission or by means of storage medium. The decoding device reconstructs an original image signal according to a scheme to be described below.

Hereinafter, an embodiment of the present invention of precisely padding a corresponding block of the base layer encoded in the intra mode in order to obtain the reference block in a procedure of encoding a macro block of the enhanced layer in the intra_BASE mode will be described.

The padding area (A+B+C+D) shown in FIG. 2 corresponds to a part of the overall padding area (¼ times the overall padding area) to be padded with data for the corresponding block. In the same manner, with respect to remaining padding areas (¾ times the overall padding area), the data may be padded by dividing the areas having the same shape as the padding area shown in FIG. 2 (each divided area has a difference of a multiple of 90 degrees).

The A, B, and C blocks shown in FIG. 2 may be padded through the scheme described above.

Figure 5:
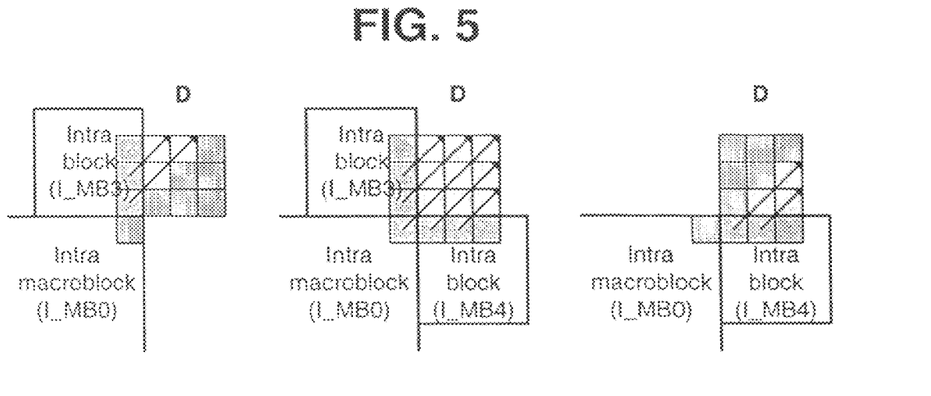
FIG. 5 is a view illustrating an example of padding data into a pixel of an area making contact with a corner pixel of a block to be padded according to the present invention.

FIG. 5 is a view illustrating a scheme of padding data in a pixel ([i,-j], i=16, 17, 18, j=1, 2, 3) in an area (D block) making contact with a corner pixel of the I_MB0 to be padded in a diagonal direction.

If the D block is positioned in a block encoded in an intra mode, pixel values of the D block are maintained as they are.

However, if the D block is not positioned in a block encoded in an intra mode, it is determined if areas adjacent to the I_MB0 together with the D block, that is, an E block (not shown) including [15,-1] and an F block (not shown) including [16,0] are encoded in the intra mode.

I) If the E block and the F block are encoded in the intra mode at the same time (the E block is labeled as 'I_MB3', and the F block is labeled as 'I_MB4'), each pixel value p[i,-j] in the D block is calculated through the predetermined scheme used when the A block is padded. That is, each pixel value of the D block is calculated based on a pixel ([15,-j], j=1, 2, 3) on the right boundary of the I_MB3, the most right-up pixel ([15,0]) of the I_MB0, and a pixel ([i, 0], i=16, 17, 18) on the up boundary of the I_MB4.

II) In a case in which the E block is encoded in the intra mode (when the E block is I_MB3), and the F block is not encoded in the intra mode, a pixel ([i,-j], i=16, 17, 18, j=1, 2, 3, i-j<15) positioned at a left side (or, an up side) with respect to a pixel positioned in a diagonal line extending in the right-up direction from the most left-down pixel ([16,-1]) of the D block making contact with the I_MB0 in a diagonal direction, is calculated based on a pixel ([15,-j], j=1, 2, 3) positioned on the right boundary in the I_MB3. In addition, a pixel positioned at a right side of the pixel positioned on the diagonal line and the pixel positioned on the diagonal line are padded with the same value as that of the most right-up pixel ([15,0]) of the I_MB0 making contact with the D block in a diagonal direction.

III) If the F block is encoded in the intra mode (the F block is labeled as I_MB4), and the E blocks is not encoded in the intra mode, a pixel ([i, -j], i=16, 17, 18, j=1, 2, 3, i-j<15) positioned at a right side (an up side) with respect to a pixel positioned in a diagonal line extending in the right-up direction from the most left-down pixel ([16,-1]) of the D block, which matches with the I_MB0 in a diagonal direction, is calculated based on a pixel ([i,0], i=16, 17, 18) on the up boundary in the IMB4. A pixel positioned light of a pixel on the diagonal line and the pixel on the diagonal line are padded with the same value as that of the most right-up pixel ([15,0]) of the I_MB0 matching with the D block in a diagonal direction.

IV) If none of the E block and the F block are encoded in the intra mode, each pixel in the D block is padded with the same value as that of the most right-up pixel ([15,0]) of the I_MB0 making contact with the D block in a diagonal direction. That is, p[i,-j]=p[15,0], wherein i=16, 17, 18, j=1, 2, 3.

Figure 6:
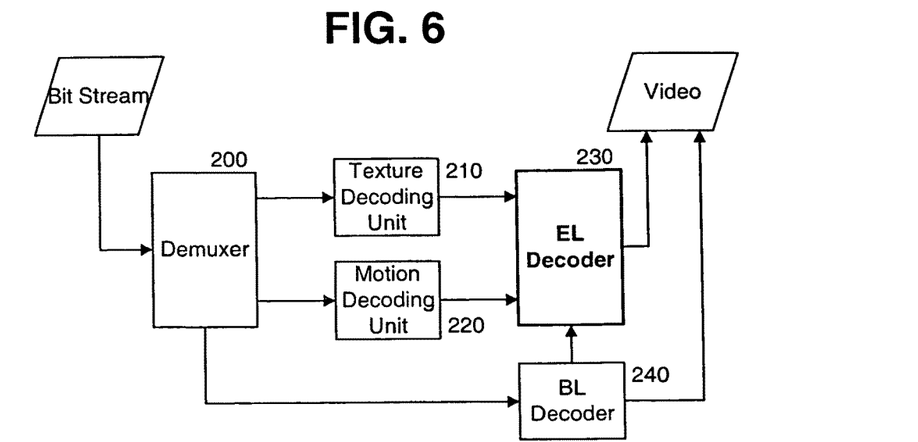
FIG. 6 is a block diagram illustrating the structure of a device for decoding data stream encoded by the device shown in FIG. 3.

FIG. 6 is a block diagram illustrating the structure of the decoding device for decoding the data stream encoded by the device shown in FIG. 2. The decoder shown in FIG. 6 includes a de-muxer 200 for dividing the received data stream into a compressed motion vector stream and a compressed macro block information stream, a texture decoding unit 210 for reconstructing an original uncompressed information stream from the compressed macro block information stream, a motion decoding unit 220 for reconstructing an original uncompressed stream from a compressed motion vector stream, an enhanced, layer (EL) decoder 230 for converting the uncompressed macro block information stream and the motion vector stream into an original image signal through an MCTF scheme, and a base layer (BL) decoder 240 for decoding base layer stream through a predetermined scheme such as the MPEG 4 scheme or the H.264 scheme. The EL decoder 230 uses base layer encoding information such as mode information and reconstructed image data of the base layer directly extracted from the base layer stream, or obtained by inquiring the information and the data from the BL decoder 240.

Figure 7:
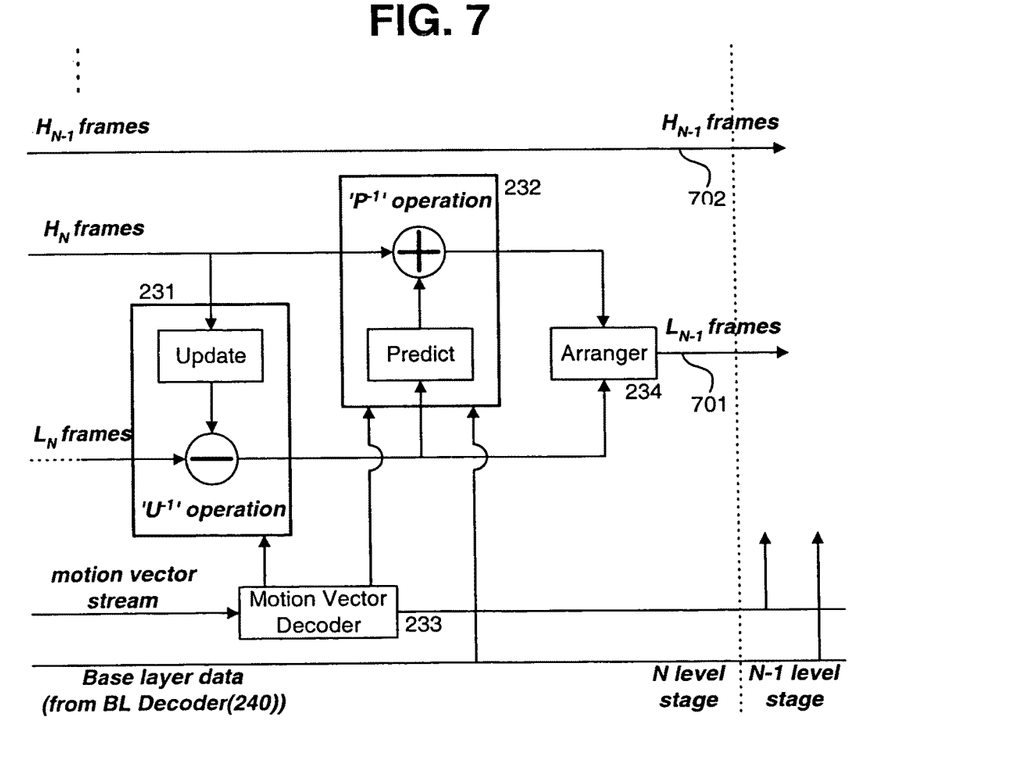
FIG. 7 illustrates the structure performing temporal composition with respect to the sequence of H frames and the sequence of L frames in a temporal decomposition level so as to make the sequence of L frames.

The EL decoder 230 decodes an input stream into data having an original frame sequence, and FIG. 7 is a block diagram illustrating the main structure of the EL decoder 230 employing the MCTF scheme in detail.

FIG. 7 illustrates the structure performing temporal composition with respect to the sequence of H frames and the sequence of L frames so as to make the sequence of L frames in a temporal decomposition level of N−1. The structure shown in FIG. 7 includes an inverse update unit 231 for selectively subtracting difference pixel values of input H frames from pixel values of input L frames, an inverse prediction unit 232 for reconstructing L frames having original images using the H frames and L frames obtained by subtracting the image difference values of the H frames from the input L frames, a motion vector decoder 233 for providing motion vector information of each block in the H frames to both the inverse update unit 231 and the inverse prediction unit 232 in a temporal decomposition level in each stage, and an arranger 234 for making a normal L frame sequence by inserting the L frames formed by the inverse prediction unit 232 into the L frames output from the inverse update unit 231.

The L frame sequence output by the arranger 234 becomes the sequence of L frames 701 in a level of N−1 and is restored to the sequence of L frames by an inverse update unit and an inverse prediction unit in a next stage together with the sequence of input H frames 702 in the level of N−1. This procedure is performed by the number of levels in the encoding procedure, so that the sequence of original image frames is obtained.

Hereinafter, a reconstructing procedure (a temporal composition procedure) in the level of N of reconstructing an L frame in the level of N−1 from the received H frame in the level of N and the L frame in the level of N having been generated from the level of N+1 will be described in more detail.

In the meantime, with respect to a predetermined L frame (in the level of N), in consideration of a motion vector provided from the motion vector decoder 233, the inverse update unit 231 detects an H frame (in the level of N) having image difference found using a block in an original L frame (in the level of N−1) updated to a predetermined L frame (in the level of N) through the encoding procedure as a reference block and then subtracts image difference values for the macro block in the H frame from pixel values of the corresponding block in the L frame, thereby reconstructing an original L frame.

The inverse update operation is performed with respect to a block updated using image difference values of a macro block in the H frame through the encoding procedure from among blocks in the current L frame (in the level of N), so that the L frame in the level of L−1 is reconstructed.

In a macro block in a predetermined H frame, the inverse prediction unit 232 detects a reference block in an L frame (the L frame is inverse-updated and output by the inverse update unit 231) based on the motion vector provided from the motion vector decoder 233 and then adds pixel values of the reference block to difference values of pixels of the macro block, thereby reconstructing original image data.

In addition, if the intra_BASE_flag indicating that a macro block in a predetermined H frame has been encoded using a corresponding block of the base layer is included in the header of the macro block, the inverse prediction unit 232 finds the corresponding block of the base layer encoded in the intra mode (having a relative position identical to that of the macro block in a frame) temporally simultaneous with the macro block and reconstructs the corresponding area based on pixel values of another area for the intra mode. In addition, the inverse prediction unit 232 performs a padding operation for the reconstructed corresponding block through the scheme described above, enlarges the size of the reconstructed corresponding block to the size of the macro block through an interpolation operation, and then adds pixel values of the enlarged corresponding block to pixel difference values of the macro block, thereby reconstructing an original image.

If all macro blocks in the current H frame are reconstructed to an original image through the operation, and an L frame is reconstructed through the composition of the macro blocks, the L frame is alternatively arranged together with an L frame, which is reconstructed in the inverse update unit 231, through the arranger 234, so that the arranged frame is output to the next stage.

As described above, a perfect image frame sequence is reconstructed from the encoded data stream. In particular, when one GOP undergoes N prediction operations and N update operations through the encoding procedure in which the MCTF scheme may be employed, if N inverse update operations and N inverse prediction operations are performed in an MCTF decoding procedure, image quality of an original image signal can be obtained. If the operations are performed by the frequency number smaller than N, an image frame may have relatively smaller bit rates even though the image quality of the image frame is degraded somewhat as compared with an image frame through N operations. Accordingly, the decoder is designed to perform the inverse update operation and the inverse prediction operation suitably for the performance of the decoder.

The above-described decoder may be installed in a mobile communication terminal or a device for reproducing record media.

As described above, according to the present invention, a block encoded in an intra mode on a layer having relatively lower resolution is precisely padded, thereby enabling a reference block required when a macro block is encoded in an intra base mode or when a macro block encoded in the intra base mode is decoded to have more precise values. Accordingly, it is possible to improve a coding efficiency.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for decoding an image block, comprising:
receiving a video signal including data of an image block to be decoded and data of a corresponding block, the corresponding block being referenced for decoding the image block;
obtaining a corner pixel value of a first neighbor block from the video signal, the first neighbor block being adjacent to the corresponding block in a diagonal direction;
deriving a pixel value of the corresponding block based on block type of other neighbor blocks and the corner pixel value, the other neighbor blocks representing a second neighbor block and a third neighbor which are adjacent to the corresponding block in vertical and horizontal directions, respectively; and
upsampling the derived pixel value of the corresponding block,
wherein the block type of the second neighbor block and the third neighbor block represent a block being encoded in an intra mode.

2. The method of claim 1, wherein the pixel value in the corresponding block is derived by using at least one pixel of a pixel positioned on an upper boundary of the second neighbor block and a pixel positioned on a right boundary of the third neighbor block.

3. The method of claim 2, wherein the pixel value on a diagonal direction in the corresponding block is derived by using the corner pixel value, the pixel positioned on a upper boundary of the second neighbor block and the pixel positioned on a right boundary of the third neighbor block.

4. The method of claim 1, wherein the video signal comprises a base layer including the corresponding block and an enhanced layer including the image block, the enhanced layer has an image quality or spatial resolution higher than the base layer.

5. An apparatus for decoding an image block, comprising:
a demux receiving a video signal including data of an image block to be decoded and data of a corresponding block, the corresponding block being referenced for decoding the image block;
a base layer decoder obtaining a corner pixel value of a first neighbor block from the video signal, the first neighbor block being adjacent to the corresponding block in a diagonal direction, deriving a pixel value of the corresponding block based on block type of other neighbor blocks and the corner pixel value, the other neighbor blocks representing a second neighbor block and a third neighbor which are adjacent to the corresponding block in vertical and horizontal directions, respectively; and
an enhanced layer decoder upsampling the derived pixel value of the corresponding block,
wherein the block type of the second neighbor block and the third neighbor block represent a block being encoded in an intra mode.

6. The apparatus of claim 5, wherein the pixel value in the corresponding block is derived by using at least one pixel of a pixel positioned on a upper boundary of the second neighbor block and a pixel positioned on a right boundary of the third neighbor block.

7. The apparatus of claim 6, wherein the pixel value on a diagonal direction in the corresponding block is derived by using the corner pixel value, the pixel positioned on a upper boundary of the second neighbor block and the pixel positioned on a right boundary of the third neighbor block.

8. The apparatus of claim 5, wherein the video signal comprises a base layer including the corresponding block and an enhanced layer including the image block, the enhanced layer has an image quality or spatial resolution higher than the base layer.

* * * * *